United States Patent
Yegin et al.

(10) Patent No.: US 7,132,988 B2
(45) Date of Patent: Nov. 7, 2006

(54) DIRECTIONAL PATCH ANTENNA

(75) Inventors: Korkut Yegin, Grand Blanc, MI (US); William R. Livengood, Grand Blanc, MI (US); Randall J. Snoeyink, Clarkson, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/848,936

(22) Filed: May 19, 2004

(65) Prior Publication Data

US 2005/0259016 A1 Nov. 24, 2005

(51) Int. Cl.
*H01Q 21/00* (2006.01)

(52) U.S. Cl. ............... 343/727; 343/725; 343/700 MS

(58) Field of Classification Search ......... 343/700 MS, 343/702, 725, 757, 727, 895

See application file for complete search history.

(56) References Cited

U.S. PATENT DOCUMENTS

| | | | | |
|---|---|---|---|---|
| 5,166,693 A | * | 11/1992 | Nishikawa et al. | 342/422 |
| 6,320,549 B1 | * | 11/2001 | Nybeck et al. | 343/727 |
| 6,720,935 B1 | * | 4/2004 | Lamensdorf et al. | 343/895 |
| 2003/0052825 A1 | * | 3/2003 | Rao et al. | 343/700 MS |

* cited by examiner

*Primary Examiner*—Tuyet Vo
*Assistant Examiner*—Jimmy Vu
(74) *Attorney, Agent, or Firm*—Jimmy L. Funke

(57) ABSTRACT

An antenna unit is disclosed. The antenna unit includes a wire antenna element and a patch antenna element. The wire antenna element creates a null at low-elevation angles to provide directional antenna patterns in azimuth planes. Nulls of the terrestrial signal pattern are directed toward the passenger compartment of a vehicle to create a larger spatial region for reception of terrestrial signals.

6 Claims, 5 Drawing Sheets

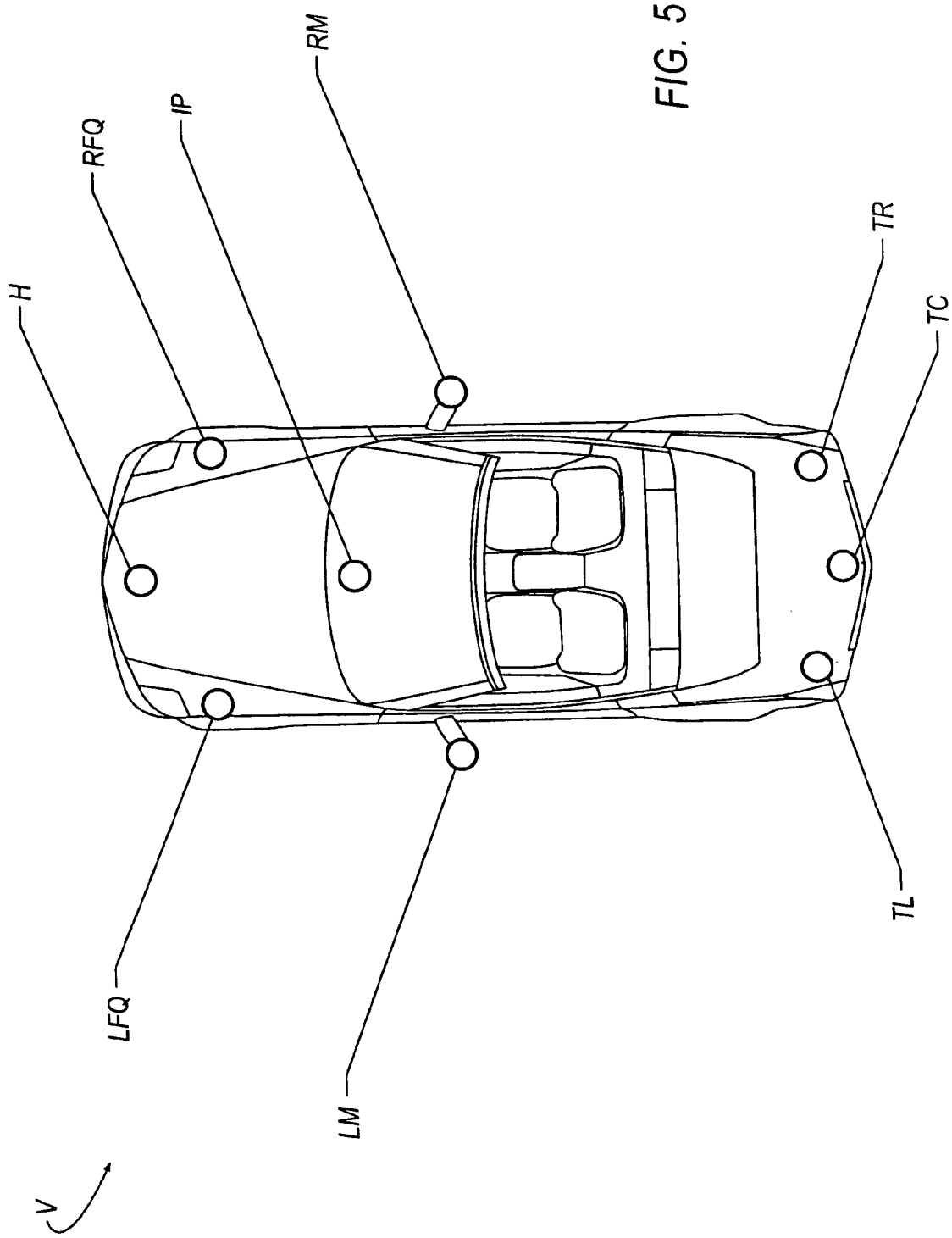

DIRECTIONAL PATCH ANTENNA

TECHNICAL FIELD

The present invention generally relates to an antenna unit that has directional reception capabilities.

BACKGROUND OF THE INVENTION

It is known in the art that automotive vehicles are commonly equipped with audio radios that receive and process signals relating to amplitude modulation/frequency modulation (AM/FM) antennas, satellite digital audio radio systems (SDARS) antennas, global positioning system (GPS) antennas, digital audio broadcast (DAB) antennas, dual-band personal communication systems digital/analog mobile phone service (PCS/AMPS) antennas, Remote Keyless Entry (RKE) antennas, Tire Pressure Monitoring System antennas, and other wireless systems.

Currently, it is known that patch antennas are employed for reception of GPS [i.e. right-hand-circular-polarization (RHCP) waves] and SDARS [i.e. left-hand-circular-polarization (LHCP) waves]. SDARS patch antennas may be considered to be a 'single element' antenna that incorporates performance characteristics of 'dual element' antennas that essentially receives terrestrial and satellite signals. SDARS—offer digital radio service covering a large geographic area, such as North America. Satellite-based digital audio radio services generally employ either geo-stationary orbit satellites or highly elliptical orbit satellites that receive uplinked programming, which, in turn, is re-broadcasted directly to digital radios in vehicles on the ground that subscribe to the service. SDARS also use terrestrial repeater networks via ground-based towers using different modulation and transmission techniques in urban areas to supplement the availability of satellite broadcasting service by terrestrially broadcasting the same information. The reception of signals from ground-based broadcast stations is termed as terrestrial coverage. Hence, an SDARS antenna is required to have satellite and terrestrial coverage with reception quality determined by the service providers, and each vehicle subscribing to the digital service generally includes a digital radio having a receiver and one or more antennas for receiving the digital broadcast. GPS antennas, on the other hand, have a broad hemispherical coverage with a maximum antenna gain at the zenith (i.e. hemispherical coverage includes signals from 0° elevation at the earth's surface to signals from 90° elevation up at the sky). Emergency systems that utilize GPS, such as OnStar™, tend to have more stringent antenna specifications as they also incorporate cellular phone communication antennas.

Unlike GPS antennas which track multiple satellites at a given time, SDARS patch antennas are operated at higher frequency bands and presently track only two satellites at a time. Thus, the mounting location for SDARS patch antennas makes antenna reception a sensitive issue with respect to the position of the antenna on the vehicle. As a result, SDARS patch antennas are typically mounted exterior to the vehicle, usually on the roof, or alternatively, inside the vehicle in a hidden location. Even further, although patch antenna circular polarization patterns are generally omni-directional in the azimuth plane so that reception does not favor any particular direction, antenna reception may be limited due to antenna position relative to the vehicle.

Having a null in a certain direction reduces the signal reception to a smaller spatial region. As a result, some portion of the antenna's reception becomes useless and thereby limits the functionality of the antenna. In one scenario, orientation of a patch antenna in a diversity application may lead to the deployment of additional antennas positioned throughout the vehicle to cover all directions of possible signal reception.

Thus, when mounted inside a vehicle, conventional patch antennas have inherent performance issues relating to directionality of the reception. Accordingly, it is therefore desirable to provide an antenna unit that improves the directionality of patch antenna gains at low elevation angles to improve the terrestrial reception, and, in a diversity application, reduce the number of patch antennas needed to compensate for nulls in the pattern.

SUMMARY OF THE INVENTION

The inventors of the present invention have recognized these and other problems associated with patch antennas. To this end, the inventors have developed an antenna unit comprising a wire antenna element and a patch antenna element. Nulls of the terrestrial signal polarization pattern are directed toward the passenger compartment of a vehicle to create a larger spatial region for reception of terrestrial signals that propagate toward the vehicle.

BRIEF DESCRIPTION OF THE DRAWINGS

The present invention will now be described, by way of example, with reference to the accompanying drawings, in which:

FIG. 5 illustrates potential antenna unit configurations for a diversity application.

DESCRIPTION OF THE PREFERRED EMBODIMENT

Figure 1A:
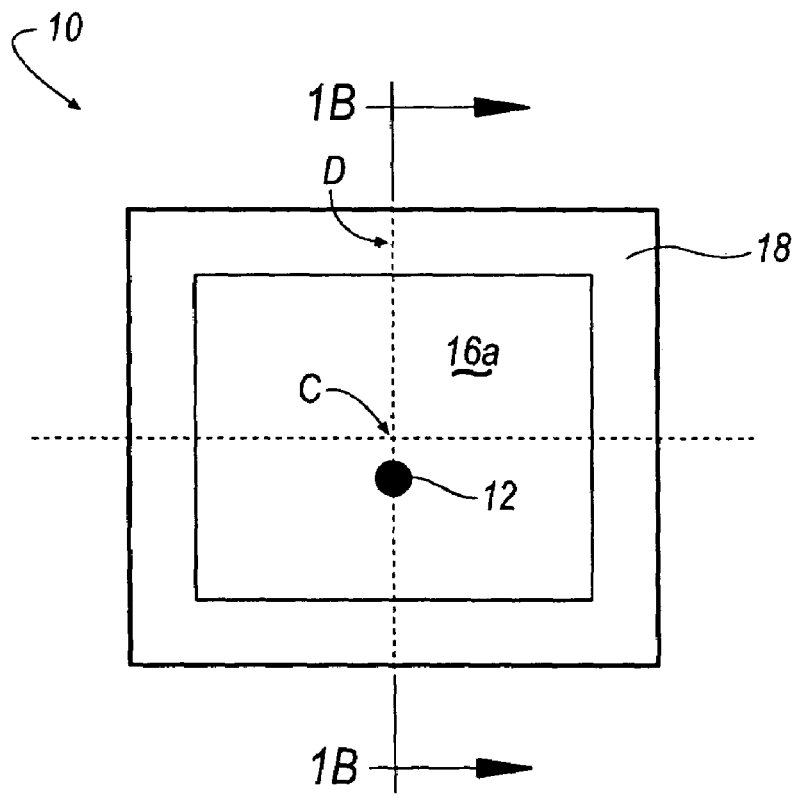
FIG. 1A illustrates a top view of an antenna unit according to an embodiment.
Figure 1B:
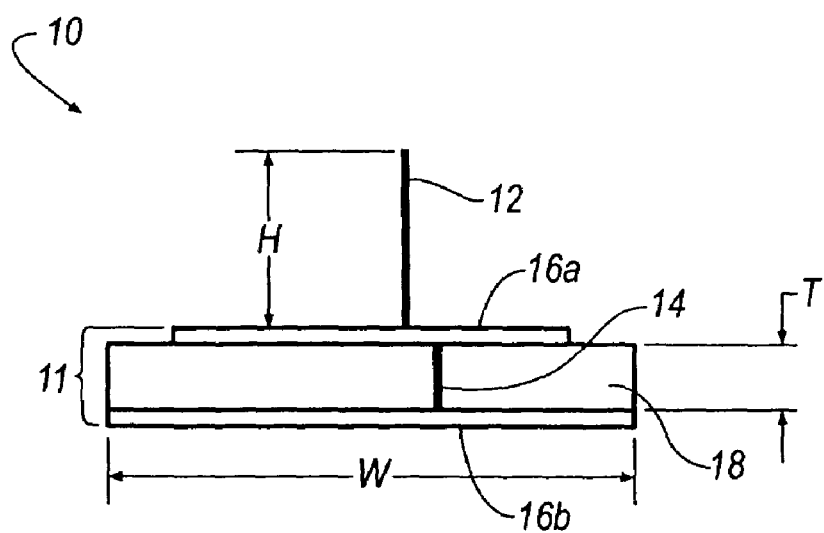
FIG. 1B illustrates a cross-sectional view of the antenna assembly according to FIG. 1A.
Figure 2A:
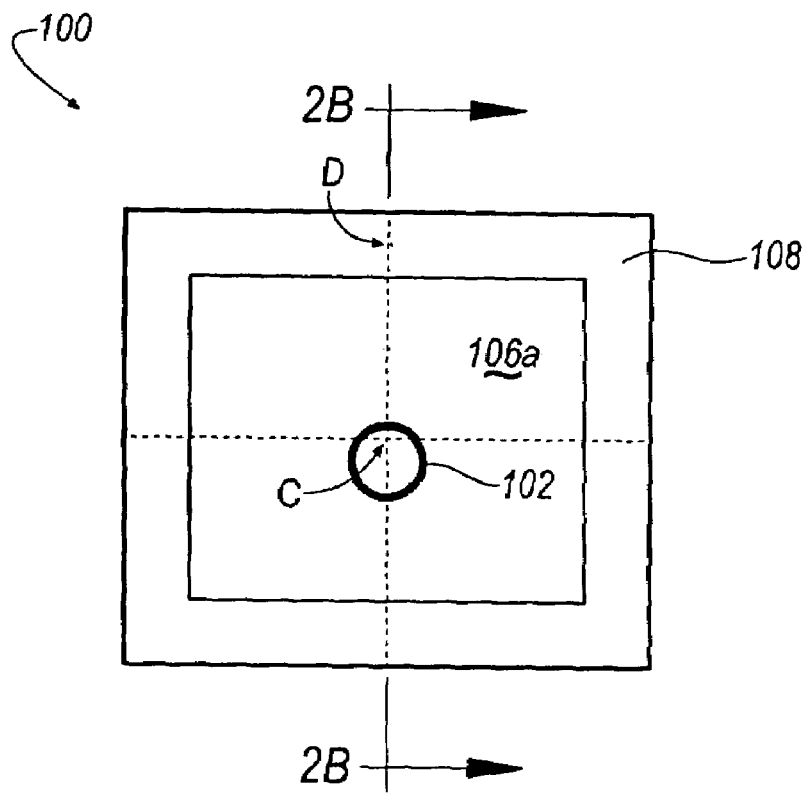
FIG. 2A illustrates a top view of an antenna unit according to another embodiment.
Figure 2B:
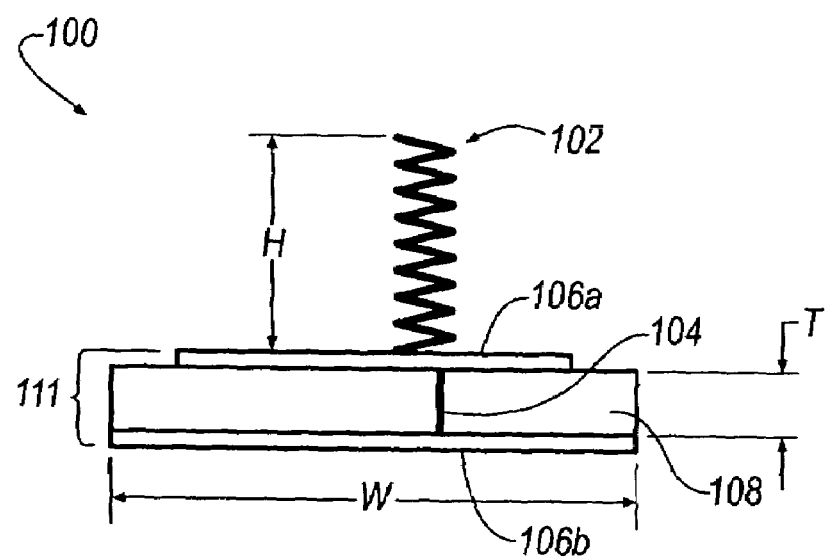
FIG. 2B illustrates a cross-sectional view of the antenna assembly according to FIG. 2A.
Figure 3A:
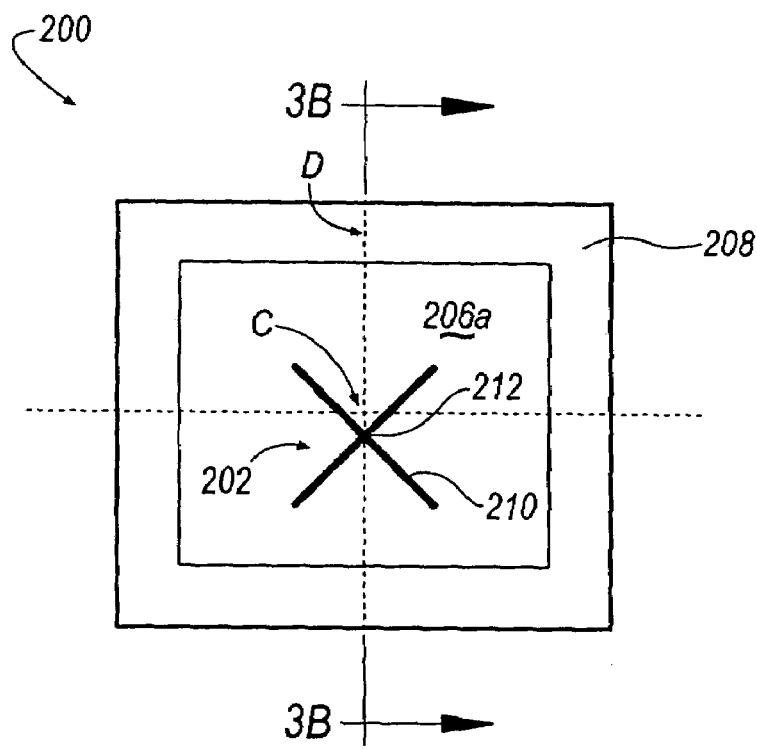
FIG. 3A illustrates a top view of an antenna unit according to another embodiment.
Figure 3B:
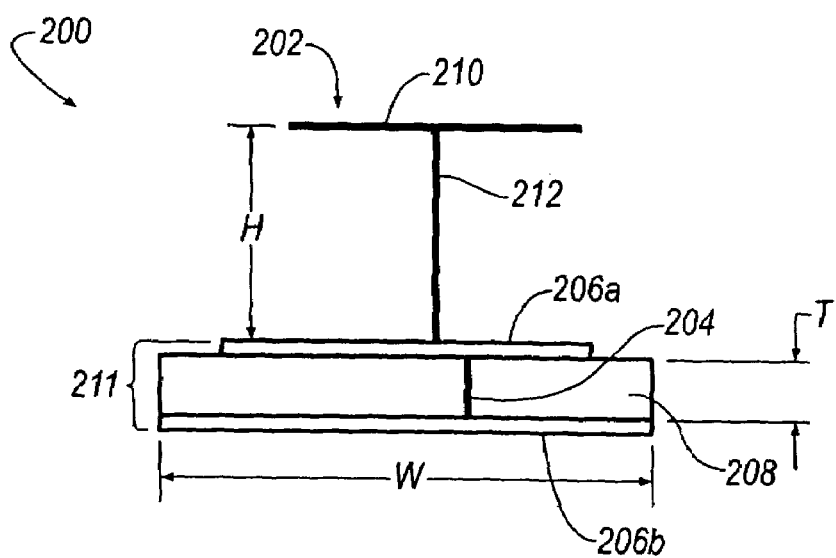
FIG. 3B illustrates a cross-sectional view of the antenna assembly according to FIG. 3A.
Figure 4A:
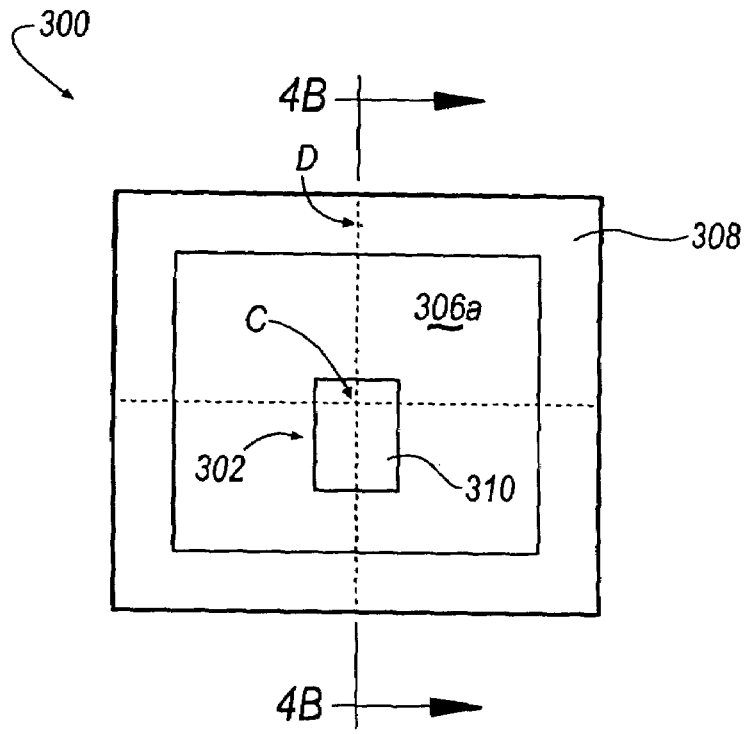
FIG. 4A illustrates a top view of an antenna unit according to another embodiment.
Figure 4B:
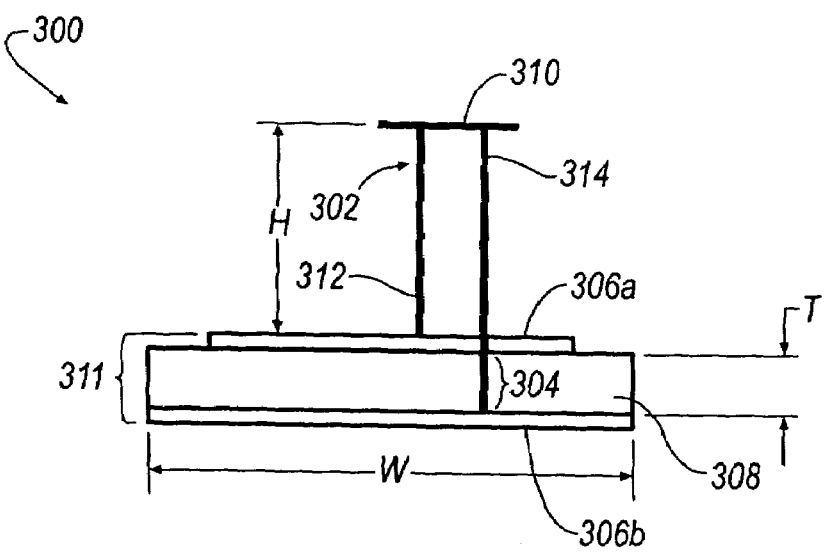
FIG. 4B illustrates a cross-sectional view of the antenna assembly according to FIG. 4A.

The above described disadvantages are overcome and a number of advantages are realized by the inventive antenna unit, which is generally illustrated at 10, 100, 200, 300 in FIGS. 1A–4B. Essentially, the antenna unit 10, 100, 200, 300 improves directional linear polarization patterns at low-elevation angles, particularly at 0°, of a wire antenna element 12, 102, 202, 302 while maintaining circular polarization characteristics of a patch antenna element 11, 111, 211, 311. Referring initially to FIGS. 1A and 1B, the antenna unit 10 generally includes a straight-wire antenna element 12 soldered to a patch antenna element 11. The patch antenna element 11 includes a single feed pin 14 (FIG. 1B) extending through a high dielectric substrate 18 that electrically couples a bottom metallization 16b to a top metallization 16a where the straight-wire antenna element 12 is soldered. The top and bottom metallizations 16a, 16b may include any desirable metallization, such as, for example, a silver conductive film.

As seen more clearly in FIG. 1A, the straight-wire antenna element 12 is positioned in an off-centered configuration about a central area, C, of the antenna unit 10. More specifically, the straight-wire antenna element 12 is off-centered about the top metallization 16a, which is seen more clearly at the intersection of dashed lines, D, that defines the central area, C, of the antenna unit 10. Additionally, as seen more clearly in FIG. 1B, the single feed pin 14 is off-centered from the straight-wire antenna element 12. Although the single feed pin 14 is off-centered from the straight-wire antenna element 12, the feed pin 14 may be aligned with the straight-wire antenna element 12, if desired. The height, H, of the straight-wire antenna element 12 from top metallization 16a is less than free-space quarter wavelength due to the presence of high dielectric substrate 18 which makes the straight-wire antenna element 12 appear electrically longer. For example, the straight-wire antenna element 12 may include a height, H, approximately equal to, for example, 2 mm positioned over the high dielectric substrate 18 having a thickness, T, approximately equal to, for example, 5 mm, that makes the height, H, physically appear to be 10 mm high rather than 2 mm.

Alternate embodiments of the antenna unit 10 are seen generally at reference numerals 100, 200, 300 in FIGS. 2A–4B. Each antenna unit 100, 200, 300 includes a top metallization 106a, 206a, 306a that is electrically connected to a bottom metallization 106b, 206b, 306b through a substrate 108, 208, 308 by a single feed pin 104, 204, 304. As illustrated, the antenna unit 100 includes a helical antenna element 102 (FIGS. 2A, 2B) and the antenna unit 200 includes a cross antenna element 202 (FIGS. 3A, 3B) that are each soldered to the top metallization 106a, 206a, respectively. The cross antenna element 202 generally includes a straight-wire stem portion 212 and an X-shaped cross portion 210. Alternatively, the antenna unit 300 includes a top-loaded monopole element 302 (FIG. 4A, 4B) joined directly to the single fed pin 304. The top-loaded monopole element 302 generally includes a top plate 310, a first stem 312 soldered to the top metallization 306a, and a second stem 314 that is electrically coupled to the feed pin 304.

In application, the helical antenna 102 presents an inductive loading to the antenna unit, and the X-shaped cross portion 210 and top plate 310 each presents a capacitive load to the respective antenna units 200, 300 to electrically extend the height of the antenna unit 200, 300. As illustrated in FIGS. 2A–4B, the antenna elements 102, 202, 302 and single feed pins 104, 204, 304 are off-centered in a similar fashion as described above with respect to the straight-wire antenna element 12. In application, the wire antenna elements 12, 102, 202, 302 may be off-centered from the central area, C, at any desirable distance, such as, for example, 1 mm. Because most patch antennas may have a width approximately equal to 10 mm, a shift of 1 mm, for example, is approximately equal to a 10% shift in the overall width, W, of the patch antenna 11, 111, 211, 311. Although each wire antenna element 12, 102, 202, 302 is shown off-center, the wire antenna elements 12, 102, 202, 302 do not have to be off-centered, and may include any desirable positioning, such as, for example, a centered positioning.

The directionality of the linear polarization pattern is maintained by controlling the height of the wire antenna element 12, 102, 202, 302, and by providing the single pin feed 14, 104, 204, 304 on the top surface of the antenna unit 10, 100, 200, 300 for the patch antenna 11, 111, 211, 311 and the wire antenna 12, 102, 202, 302.

As explained above, circular polarization patterns are generally omni-directional. Because the antenna units 10, 100, 200, 300 have a small ground plane, the radiation patterns tend to become highly directional by receiving more radiation at zenith (i.e. elevation angle of 90°) and receiving less radiation patterns at lower elevation angles (i.e. elevation angles closer to 0°). In application, when any of the antenna units 10, 100, 200, 300 are mounted inside a vehicle, V, (FIG. 5), the directional antenna power pattern is faced away from the vehicle. More specifically, the ground plane, of the antenna unit 10, 100, 200, 300 is faced toward the inside of the vehicle and the wire antenna element 12, 102, 202, 302 is faced toward the outside of the vehicle. By facing the directional antenna power pattern of the antenna unit 10, 100, 200, 300 away from the inside of the vehicle, the null in the power pattern may be selectively located toward the inside of the vehicle. As a result, the antenna unit 10, 100, 200, 300 favors a particular direction for signal reception, creating a larger spatial region for radiation patterns that propagate toward the vehicle.

The antennas units 10, 100, 200, 300, when positioned in a vehicle as described above, may improve upon conventional vehicular diversity configurations. As known, diversity antenna applications operate on the principle such that two or more antenna units complement each other to cover the expected satellite signal from one or more satellites to increase the probability of uninterrupted reception of the satellite signals when physical obstructions, such as tall buildings or trees impede the line of sight (LOS) of at least one of the antenna units. This is accomplished by receiving a terrestrially-repeated signal of the obstructed satellite signal. As seen in FIG. 5, a diversity antenna application may be applied using any desirable antenna placement configuration. For example, antenna units may be located under the trunk lid in a center location (TC), a left, driver-side location (TL), a right, passenger-side location (TR), a hood location (H), a left, driver-side front quarter panel location (LFQ), a right, passenger-side front quarter panel location (RFQ), an instrument panel location (IP), an left, driver-side mirror location (LM), a right, passenger-side mirror location (RM), or any other location about the vehicle, V, desired by the antenna designer. By implementing the antenna unit 10, 100, 200, 300 in a diversity application such that nulls in the power pattern face the inside of the vehicle (i.e. the passenger compartment area), an improved diversity application is provided. For example, if antenna units 10, 100, 200, 300 are located at the LFQ, RFQ, TL, and TR locations, such that the nulls of each antenna location are faced toward the inside of the vehicle, a uniform linear polarization reception is ensured 360° about the vehicle.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An antenna unit, comprising:
   a wire antenna element;

a patch antenna element, wherein nulls of a terrestrial signal polarization pattern are directed toward a passenger compartment of a vehicle to create a larger spatial region for reception of terrestrial signals that propagate toward the vehicle, wherein a height and off-centering of the wire antenna element from a central area of the antenna unit directively shifts the null of the terrestrial signal polarization pattern, wherein the patch antenna element includes a high dielectric substrate intermediately located between a top metallization and a bottom metallization, and wherein a feed pin electrically couples the top metallization to the bottom metallization.

2. A method for improving antenna radiation characteristics, comprising the steps of:

providing at least two antenna units in a vehicular diversity application, wherein the antenna unit includes a wire antenna element and a patch antenna element;

providing the wire antenna element with a height and off-centering from a central area of the antenna unit such that nulls of a terrestrial signal polarization pattern are directed toward a passenger compartment of a vehicle; and providing a larger spatial region for reception of terrestrial signals that propagate toward the vehicle, wherein the at least two antenna units are positioned in a diversity application, and wherein the diversity application positions are selected from the group consisting of a vehicular a center location, left, driver-side location, a right, passenger-side location, a hood location, a left, driver-side front quarter panel location, a right, passenger-side front quarter panel location, an instrument panel location, a left, driver-side mirror location, and a right, passenger-side mirror location.

3. An antenna unit, comprising:

a wire antenna element; and a patch antenna element, wherein nulls of a terrestrial signal polarization pattern are directed toward a passenger compartment of a vehicle to create a larger spatial region for reception of terrestrial signals that propagate toward the vehicle, and wherein the patch antenna element includes a high dielectric substrate intermediately located between a top metallization and a bottom metallization, and wherein a feed pin electrically couples the top metallization to the bottom metallization, and wherein the wire antenna element includes a top plate coupled to a first stem soldered to the patch antenna and a second stem joined directly to the feed pin.

4. An antenna unit, comprising:

a wire antenna element;

a patch antenna element, wherein nulls of a terrestrial signal polarization pattern are directed toward a passenger compartment of a vehicle to create a larger spatial region for reception of terrestrial signals that propagate toward the vehicle, wherein a height and off-centering of the wire antenna element from a central area of the antenna unit directively shifts the null of the terrestrial signal polarization pattern, and wherein the wire antenna element is a straight-wire element soldered to the patch antenna element.

5. An antenna unit, comprising:

a wire antenna element;

a patch antenna element, wherein nulls of a terrestrial signal polarization pattern are directed toward a passenger compartment of a vehicle to create a larger spatial region for reception of terrestrial signals that propagate toward the vehicle, wherein a height and off-centering of the wire antenna element from a central area of the antenna unit directively shifts the null of the terrestrial signal polarization pattern, and wherein the wire antenna element is a helical element soldered to the patch antenna element.

6. An antenna unit, comprising:

a wire antenna element;

a patch antenna element, wherein nulls of a terrestrial signal polarization pattern are directed toward a passenger compartment of a vehicle to create a larger spatial region for reception of terrestrial signals that propagate toward the vehicle, wherein a height and off-centering of the wire antenna element from a central area of the antenna unit directively shifts the null of the terrestrial signal polarization pattern, and wherein the wire antenna element includes a cross-antenna element coupled to a stem that is soldered to the patch antenna element.

* * * * *